United States Patent
Uselmann et al.

(10) Patent No.: US 6,727,808 B1
(45) Date of Patent: Apr. 27, 2004

(54) SONIC BLIND SPOT MONITORING SYSTEM

(76) Inventors: David J. Uselmann, 2705 Homestead Rd., Madison, WI (US) 53711; Linda M. Uselmann, 2705 Homestead Rd., Madison, WI (US) 53711

( * ) Notice: Subject to any disclaimer, the term of this patent is extended or adjusted under 35 U.S.C. 154(b) by 96 days.

(21) Appl. No.: 10/023,415

(22) Filed: Dec. 14, 2001

(51) Int. Cl.[7] .............................. B60Q 1/00; G08G 1/16
(52) U.S. Cl. ...................... 340/436; 340/435; 340/903; 180/167; 180/169; 367/909
(58) Field of Search .................................. 340/903, 904, 340/435, 436; 180/167, 169; 367/909, 910, 87, 91, 93, 94

(56) References Cited

U.S. PATENT DOCUMENTS

| | | | |
|---|---|---|---|
| 3,675,190 A | * 7/1972 | Auer, Jr. et al. | 340/904 |
| 4,349,823 A | 9/1982 | Tagami et al. | |
| 4,490,716 A | * 12/1984 | Tsuda et al. | 340/904 |
| 4,694,295 A | * 9/1987 | Miller et al. | 340/903 |
| 5,173,881 A | * 12/1992 | Sindle | 367/101 |
| 5,235,316 A | * 8/1993 | Qualizza | 340/436 |
| 5,325,096 A | 6/1994 | Pakett | |
| 5,339,075 A | 8/1994 | Abst et al. | |
| D365,317 S | 12/1995 | Hellmund | |
| 5,517,196 A | 5/1996 | Pakett et al. | |
| 5,786,772 A | 7/1998 | Schofield et al. | |
| 5,929,786 A | * 7/1999 | Schofield et al. | 340/903 |

* cited by examiner

*Primary Examiner*—Donnie L. Crosland

(57) ABSTRACT

A sonic blind spot monitoring system for alerting a driver when a vehicle is positioned in a blind spot. The sonic blind spot monitoring system includes a vehicle. A sonar device is coupled to the vehicle for emitting a sonar wave into an area adjacent to the vehicle corresponding to a blind spot for a driver of the vehicle. The sonar device includes a sonar receptor for receiving a reflection of the sonar wave for detecting an object in said blind spot. A display device is coupled to the vehicle. The display device is positioned within the vehicle whereby the display device is visible to the driver of the vehicle. The display device is operationally coupled to the sonar device for displaying a visual signal when the sonar device detects the object in the blind spot.

5 Claims, 2 Drawing Sheets

SONIC BLIND SPOT MONITORING SYSTEM

BACKGROUND OF THE INVENTION

1. Field of the Invention

The present invention relates to smart blind spot sensors and more particularly pertains to a new sonic blind spot monitoring system for alerting a driver when a vehicle is positioned in a blind spot.

2. Description of the Prior Art

The use of smart blind spot sensors is known in the prior art. U.S. Pat. No. 5,517,196 describes a system for alerting a driver when a vehicle is positioned in a blind spot of the driver's vehicle. Another type of smart blind spot sensor is U.S. Pat. No. 5,339,075 having an ultrasonic transmitter for emitting acoustic energy to identify a vehicle positioned in a blind spot. Another type of smart blind spot sensor is U.S. Pat. No. 5,786,772 having a blind spot detector positioned within an external mirror of a vehicle for detecting vehicles positioned in the blind spot. Another type of smart blind spot sensor is U.S. Pat. No. 5,325,096 having a radar system for detecting vehicles positioned in the blind spot of the driver's vehicle. Another type of smart blind spot sensor is U.S. Pat. No. Des. 356,317 showing a rear view mirror. Another type of smart blind spot sensor is U.S. Pat. No. 4,349,823 having a radar system for detecting vehicles positioned in the blind spots of a driver's vehicle.

SUMMARY OF THE INVENTION

Still yet another object of the present invention is to provide a new sonic blind spot monitoring system that indicates to a user when a vehicle is positioned in a driver's blind spot.

Even still another object of the present invention is to provide a new sonic blind spot monitoring system that FOCUSED2.

To this end, the present invention generally comprises a vehicle. A sonar device is coupled to the vehicle for emitting a sonar wave into an area adjacent to the vehicle corresponding to a blind spot for a driver of the vehicle. The sonar device includes a sonar receptor for receiving a reflection of the sonar wave for detecting an object in said blind spot. A display device is coupled to the vehicle. The display device is positioned within the vehicle whereby the display device is visible to the driver of the vehicle. The display device is operationally coupled to the sonar device for displaying a visual signal when the sonar device detects the object in the blind spot.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
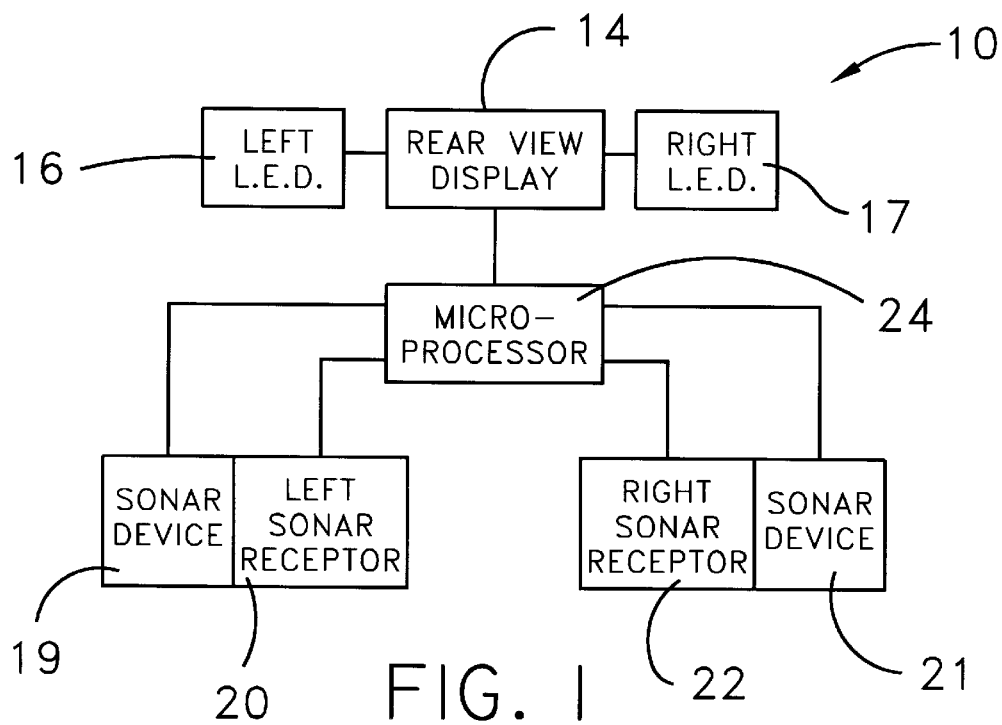
FIG. 1 is a schematic view of a new sonic blind spot monitoring system according to the present invention.
Figure 2:
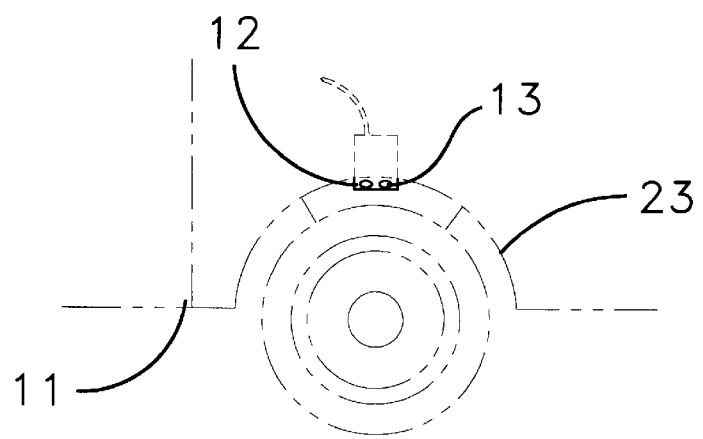
FIG. 2 is a side view of the sonar device of the present invention.
Figure 3:
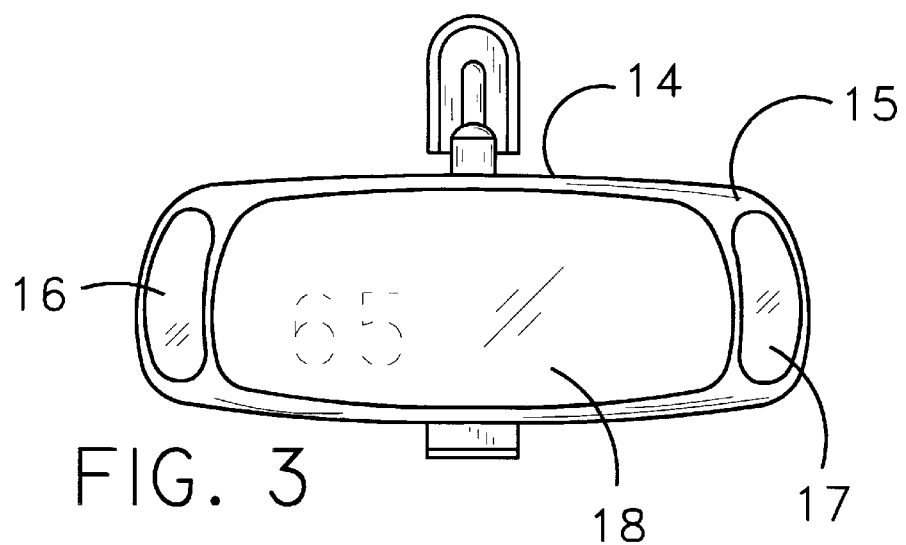
FIG. 3 is a front view of the display device of the present invention.
Figure 4:
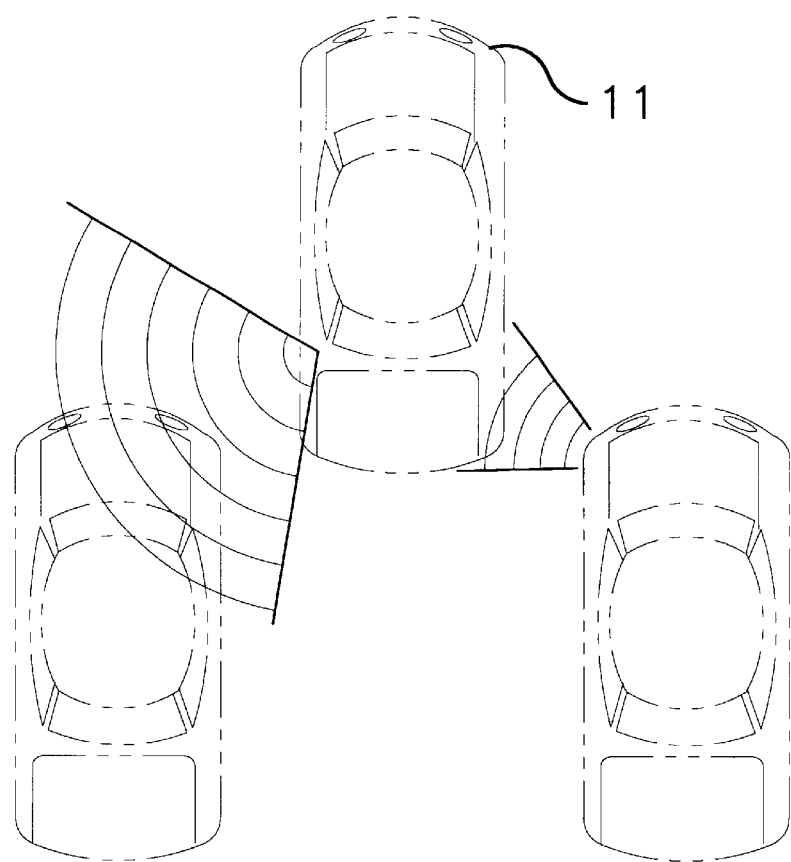
FIG. 4 is a top view of the present invention in use.

With reference now to the drawings, and in particular to FIGS. 1 through 4 thereof, a new sonic blind spot monitoring system embodying the principles and concepts of the present invention and generally designated by the reference numeral 10 will be described.

As best illustrated in FIGS. 1 through 4, the sonic blind spot monitoring system 10 generally comprises a vehicle 11. A sonar device 12 is coupled to the vehicle 11 for emitting a sonar wave into an area adjacent to the vehicle 11 corresponding to a blind spot for a driver of the vehicle 11. The sonar device 12 includes a sonar receptor 13 for receiving a reflection of the sonar wave for detecting an object in the blind spot.

A display device 14 is coupled to the vehicle 11. The display device 14 is positioned within the vehicle 11 whereby the display device 14 is visible to the driver of the vehicle 11. The display device 14 is operationally coupled to the sonar device 12 for displaying a visual signal when the sonar device 12 detects the object in the blind spot. The display device 14 is a rear view mirror 15 coupled to the vehicle 11. The display device 14 has a first display light 16, a second display light 17, and a central mirror 18 positioned between the first and second display light 17s.

The sonar device 12 is a first sonar device 19. The sonar receptor 13 is a first sonar receptor 20, and the blind spot is a first blind spot. A second sonar device 21 is coupled to the vehicle 11 for emitting a second sonar wave into a second area adjacent to the vehicle 11 corresponding to a second blind spot for the driver of the vehicle 11. The second sonar device 21 includes a second sonar receptor 22 for receiving a reflection of the second sonar wave for detecting an object in the second blind spot. The first sonar device 19 and the second sonar device 21 each emit 10 sonar waves per second with the first and second sonar receptor 22 being for detecting a vehicle 11 in the blind spots if a sonar wave is received within 0.02 second after the sonar wave is emitted by the associated sonar device 12.

The vehicle 11 has a pair of rear wheel wells 23. Each of the sonar device 12s is positioned in an associated one of the wheel wells of the vehicle 11. The first and second sonar device 21s are positioned on opposite sides of the vehicle 11.

The first sonar device 19 is operationally coupled to the first display light 16 for illuminating the first display light 16 when the first sonar device 19 detects an object in the first blind spot. The second sonar device 21 is operationally coupled to the second display light 17 for illuminating the second display light 17 when the second sonar device 21 detects an object in the second blind spot.

A microprocessor 24 is operationally coupled between the first sonar device 19 and the first display light 16 for activating the first display light 16 only upon the first sonar receptor 20 receiving the reflection of the sonar wave within a pre-determined time from the first sonar device 19 emitting the sonar wave. The microprocessor 24 is operationally coupled between the second sonar device 21 and the second display light 17 for activating the second display light 17 only upon the second sonar receptor 22 receiving the reflection of the sonar wave within a pre-determined time from the second sonar device 21 emitting the sonar wave. The first display light 16 and the second display light 17 each comprise an light emitting diode.

In use, the user drives the vehicle 11 with the sonar device 12s active. The first display light 16 lights when a vehicle 11 is positioned in the first blind spot of the vehicle 11 to alert the driver of a vehicle 11 positioned in the first blind spot. The second display light 17 lights when a vehicle 11 is positioned in the second blind spot of the vehicle 11 to alert the driver of a vehicle 11 positioned in the second blind spot.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A sonic blind spot monitoring system comprising:
    a vehicle;
    a sonar device coupled to said vehicle for emitting a sonar wave into an area adjacent to said vehicle corresponding to a blind spot for a driver of said vehicle;
    said sonar device including a sonar receptor for receiving a reflection of said sonar wave for detecting an object in said blind spot;
    a display device coupled to said vehicle, said display device being positioned within said vehicle such that said display device is visible to the driver of said vehicle, said display device being operationally coupled to said sonar device for displaying a visual signal when said sonar device detects the object in said blind spot;
    said sonar device being a first sonar device, said sonar receptor being a first sonar receptor, and said blind spot beings a first blind spot;
    a second sonar device coupled to said vehicle for emitting a second sonar wave into a second area adjacent to said vehicle corresponding to a second blind spot for the driver of said vehicle;
    said second sonar device including a second sonar receptor for receiving a reflection of said second sonar wave for detecting an object in said second blind spot;
    said first and second sonar devices being positioned on opposite sides of said vehicle;
    said display device being a rearview mirror having a first display light, a second display light, and a central mirror positioned between said first and second display lights;
    said first sonar device being operationally coupled to said first display light for illuminating said first display light when said first sonar device detects an object in said first blind spot;
    said second sonar device being operationally coupled to said second display light for illuminating said second display light when said second sonar device detects an object in said second blind spot; and
    said first display light being positioned proximate a first end of said central mirror such that said first display light is adapted for drawing the attention of the user to a side of said central mirror that the object is positioned on to maintain visual checking in said central mirror when said first sonar device detects the object in said first blind spot, said second display light being positioned proximate a second end of said central mirror such that said second display light is adapted for drawing the attention of the user to a side of said central mirror that the object is positioned on to maintain visual checking in said central mirror where said second sonar device detects the object in said second blind spot.

2. The sonic blind spot monitoring system of claim 1, further comprising:
    said vehicle having a pair of rear wheel wells, each of said sonar devices being positioned in an associated one of said wheel wells of said vehicle.

3. The sonic blind spot monitoring system of claim 1, further comprising:
    a microprocessor operationally coupled between said sonar device and said display device for activating said display device only upon said sonar receptor receiving said reflection of said sonar wave within a pre-determined time from said sonar device emitting said sonar wave.

4. The sonic blind spot monitoring system of claim 1, further comprising:
    a microprocessor operationally coupled between said first sonar device and said first display light for activating said first display light only upon said first sonar receptor receiving said reflection of said sonar wave within a pre-determined time from said first sonar device emitting said sonar wave; and
    said microprocessor being operationally coupled between said second sonar device and said second display light for activating said second display light only upon said second sonar receptor receiving said reflection of said sonar wave within a pre-determined time from said second sonar device emitting said sonar wave.

5. A sonic blind spot monitoring system comprising:
    a vehicle;
    a sonar device coupled to said vehicle for emitting a sonar wave into an area adjacent to said vehicle corresponding to a blind spot for a driver of said vehicle;
    said sonar device including a sonar receptor for receiving a reflection of said sonar wave for detecting an object in said blind spot;
    a display device coupled to said vehicle, said display device being positioned within said vehicle such that said display device is visible to the driver of said vehicle, said display device being operationally coupled to said sonar device for displaying a visual signal when said sonar device detects the object in said blind spot;
    said display device being a rear view mirror coupled to said vehicle;
    said sonar device being a first sonar device, said sonar receptor being a first sonar receptor, and said blind spot being a first blind spot;

a second sonar device coupled to said vehicle for emitting a second sonar wave into a second area adjacent to said vehicle corresponding to a second blind spot for the driver of said vehicle;

said second sonar device including a second sonar receptor for receiving a reflection of said second sonar wave for detecting an object in said second blind spot;

said vehicle having a pair of rear wheel wells, each of said sonar devices being positioned in an associated one of said wheel wells of said vehicle;

said first and second sonar devices being positioned on opposite sides of said vehicle;

said display device being a rearview mirror having a first display light, a second display light, and a central mirror positioned between said first and second display lights;

said first sonar device being operationally coupled to said first display light for illuminating said first display light when said first sonar device detects an object in said first blind spot;

said second sonar device being operationally coupled to said second display light for illuminating said second display light when said second sonar device detects an object in said second blind spot;

said first display light being positioned proximate a first end of said central mirror such that said first display light is adapted for drawing the attention of the user to a side of said central mirror that the object is positioned on to maintain visual checking in said central mirror when said first sonar device detects the object in said first blind spot, said second display light being positioned proximate a second end of said central mirror such that said second display light is adapted for drawing the attention of the user to a side of said central mirror that the object is positioned on to maintain visual checking in said central mirror when said second sonar device detects the object in said second blind spot;

a microprocessor operationally coupled between said first sonar device and said first display light for activating said first display light only upon said first sonar receptor receiving said reflection of said sonar wave within a pre-determined time from said first sonar device emitting said sonar wave; and said microprocessor being operationally coupled between said second sonar device and said second display light for activating said second display light only upon said second sonar receptor receiving said reflection of said sonar wave within a pre-determined time from said second sonar device emitting said sonar wave.

* * * * *